(12) United States Patent
Abdelghaffar et al.

(10) Patent No.: US 12,457,085 B2
(45) Date of Patent: Oct. 28, 2025

(54) FULL DUPLEX PATTERN INDICATION

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 826 days.

(21) Appl. No.: 17/652,621

(22) Filed: Feb. 25, 2022

(65) Prior Publication Data

US 2023/0275736 A1 Aug. 31, 2023

(51) Int. Cl.
*H04L 5/00* (2006.01)
*H04L 5/14* (2006.01)

(52) U.S. Cl.
CPC .............. *H04L 5/0094* (2013.01); *H04L 5/14* (2013.01)

(58) Field of Classification Search
CPC ........ H04L 5/0094; H04L 5/14; H04L 5/0092
See application file for complete search history.

(56) References Cited

U.S. PATENT DOCUMENTS

2021/0297226 A1* 9/2021 Abotabl ................. H04L 5/1461
2021/0377938 A1* 12/2021 Huang ............... H04W 72/1263

FOREIGN PATENT DOCUMENTS

WO WO-2021242931 12/2021

OTHER PUBLICATIONS

Han et al. "Interference Mitigation for Non-Overlapping Sub-Band Full Duplex for 5G-Advanced Wireless Networks" IEEE Access Dec. 19, 2022 (Year: 2022).*
International Search Report and Written Opinion—PCT/US2023/063032—ISA/EPO—Jun. 7, 2023.

* cited by examiner

*Primary Examiner* — Basil Ma
(74) *Attorney, Agent, or Firm* — QUALCOMM Incorporated

(57) ABSTRACT

Various aspects of the present disclosure generally relate to wireless communication. In some aspects, a user equipment (UE) may receive an indication of a time domain pattern for a plurality of resources that includes one or more full duplex (FD) resources. The UE may communicate with a network node in accordance with the indication of the time domain pattern. Numerous other aspects are described.

28 Claims, 15 Drawing Sheets

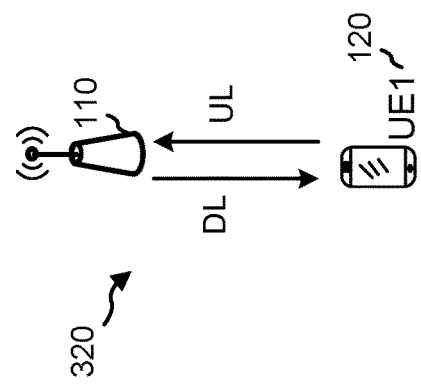
FIG. 3B
FIG. 3C
FIG. 3A

| SlotTypeCombinationId | SlotTypesCombination |
|---|---|
| 00 | {0,0,2,1,1,3,0} |
| 01 | {1,1,1,0,0,0,0,0} |
| 11 | {0,1,1,1,1,1,0} |

1000

FULL DUPLEX PATTERN INDICATION

FIELD OF THE DISCLOSURE

Aspects of the present disclosure generally relate to wireless communication and to techniques and apparatuses for full duplex pattern indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a time domain pattern for a plurality of resources that includes one or more sub-band full duplex (SBFD) resources. The method may include communicating with a base station in accordance with the indication of the time domain pattern.

Some aspects described herein relate to a method of wireless communication performed by a base station. The method may include transmitting an indication of a time domain pattern for a plurality of resources that includes one or more SBFD resources. The method may include communicating with a UE in accordance with the indication of the time domain pattern.

Some aspects described herein relate to an apparatus for wireless communication performed by a UE. The apparatus may include a memory and one or more processors, coupled to the memory. The one or more processors may be configured to receive an indication of a time domain pattern for a plurality of resources that includes one or more SBFD resources. The one or more processors may be configured to communicate with a base station in accordance with the indication of the time domain pattern.

Some aspects described herein relate to an apparatus for wireless communication performed by a base station. The apparatus may include a memory and one or more processors, coupled to the memory. The one or more processors may be configured to transmit an indication of a time domain pattern for a plurality of resources that includes one or more SBFD resources. The one or more processors may be configured to communicate with a UE in accordance with the indication of the time domain pattern.

Some aspects described herein relate to a non-transitory computer-readable medium that stores a set of instructions for wireless communication by a UE. The set of instructions, when executed by one or more processors of the UE, may cause the UE to receive an indication of a time domain pattern for a plurality of resources that includes one or more SBFD resources. The set of instructions, when executed by one or more processors of the UE, may cause the UE to communicate with a base station in accordance with the indication of the time domain pattern.

Some aspects described herein relate to a non-transitory computer-readable medium that stores a set of instructions for wireless communication by a base station. The set of instructions, when executed by one or more processors of the base station, may cause the base station to transmit an indication of a time domain pattern for a plurality of resources that includes one or more SBFD resources. The set of instructions, when executed by one or more processors of the base station, may cause the base station to communicate with a UE in accordance with the indication of the time domain pattern.

Some aspects described herein relate to an apparatus for wireless communication. The apparatus may include means for receiving an indication of a time domain pattern for a plurality of resources that includes one or more SBFD resources. The apparatus may include means for communicating with a base station in accordance with the indication of the time domain pattern.

Some aspects described herein relate to an apparatus for wireless communication. The apparatus may include means for transmitting an indication of a time domain pattern for a plurality of resources that includes one or more SBFD resources. The apparatus may include means for communicating with a UE in accordance with the indication of the time domain pattern.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A-3C are diagrams illustrating examples of full duplex communication in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
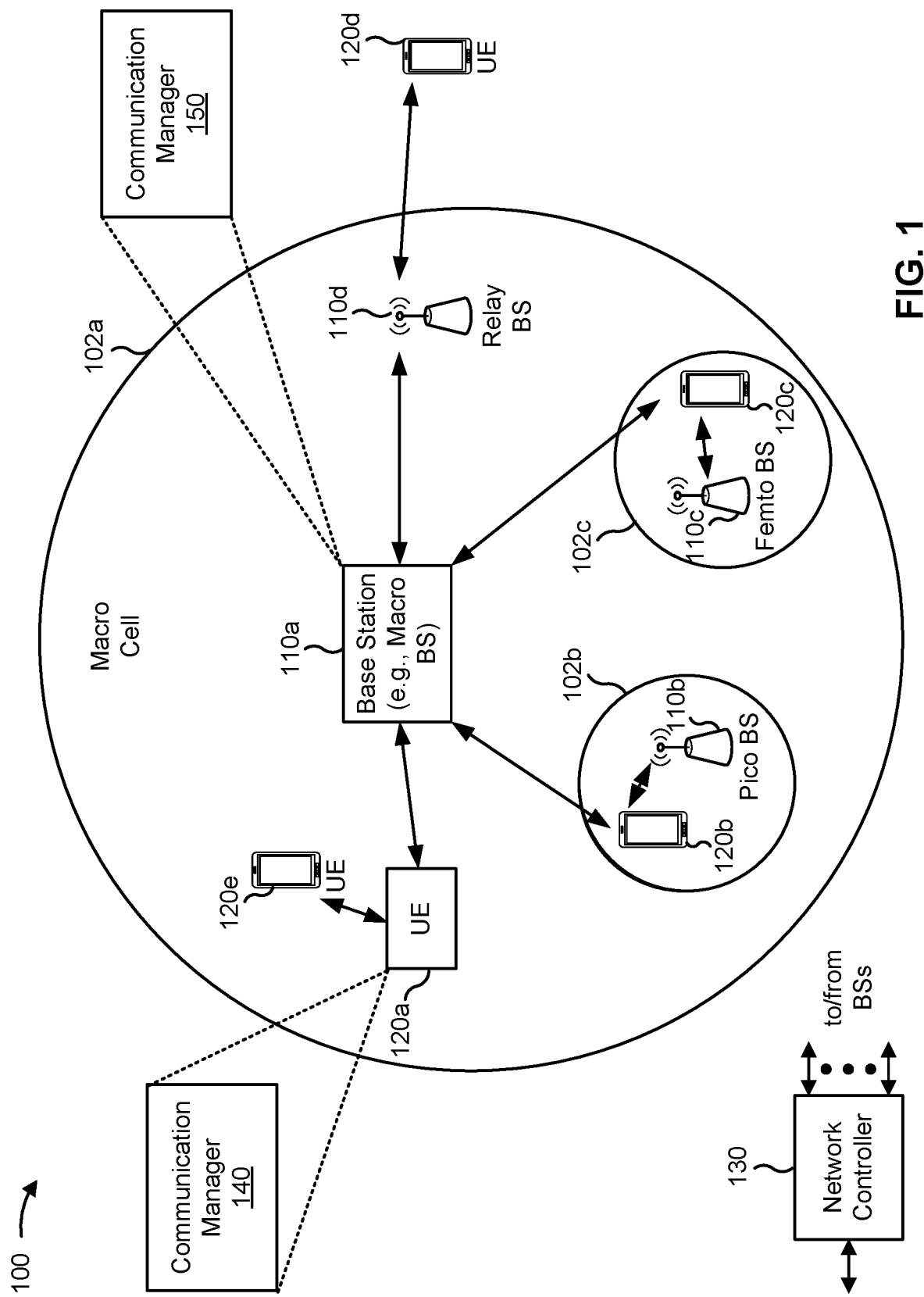
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a time domain pattern for a plurality of resources that includes one or more full duplex (FD) resources; and communicate with a base station in accordance with the indication of the time domain pattern. Additionally, or alternatively, the communication manager 140 may perform one or more other operations described herein.

In some aspects, the base station 110 may include a communication manager 150. As described in more detail elsewhere herein, the communication manager 150 may transmit an indication of a time domain pattern for a plurality of resources that includes one or more SBFD resources; and communicate with a UE in accordance with the indication of the time domain pattern. Additionally, or alternatively, the communication manager 150 may perform one or more other operations described herein.

As indicated above, FIG. 1 is provided as an example. Other examples may differ from what is described with regard to FIG. 1.

Figure 2:
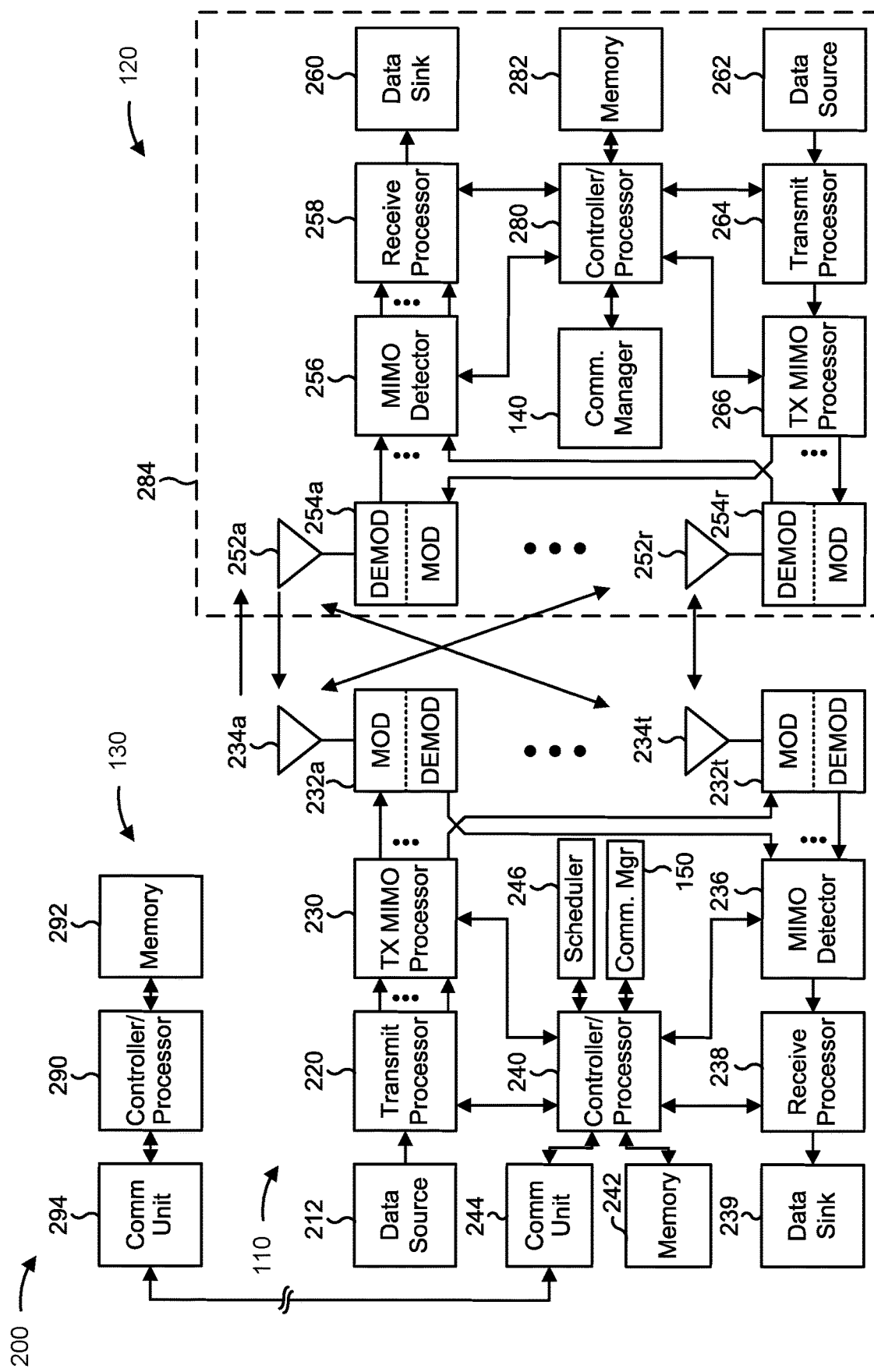
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-15).

The controller/processor 240 of the base station 110, the controller/processor 280 of the UE 120, and/or any other component(s) of FIG. 2 may perform one or more techniques associated with FD pattern indication, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving an indication of a time domain pattern for a plurality of resources that includes one or more SBFD resources; and/or means for communicating with the base station 110 in accordance with the indication of the time domain pattern. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting an indication of a time domain pattern for a plurality of resources that includes one or more SBFD resources; and/or means for communicating with a UE 120 in accordance with the indication of the time domain pattern. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex communication in a wireless network, in accordance with the present disclosure.

In some cases, "full duplex" (FD) communication in the wireless network may refer to simultaneous bi-directional communication between devices in the wireless network. For example, a UE 120 operating in a full duplex mode may transmit an uplink communication and receive a downlink communication at the same time (e.g., in the same slot or the same symbol). In contrast, "half duplex" (HD) communication in the wireless network may refer to unidirectional communications (e.g., only downlink communication or only uplink communication) between devices at a given time (e.g., in a given slot or a given symbol). For example, the UE 120 operating in the half duplex mode may only transmit a communication, or receive a communication, at the given time.

In some cases, a device may communicate using time division duplexing (TDD). For example, the UE 120 or the base station 110 operating in the TDD mode may use a single frequency for both uplink and downlink communications, but may not be able to perform simultaneous transmissions. In some cases, a device may communicate using frequency division duplexing (FDD). For example, the UE 120 or the base station 110 operating in the FDD mode may be able to perform simultaneous communications using separate frequencies for the uplink and downlink.

The example 300 of FIG. 3A includes a UE1 120 and two base stations (e.g., transmission-reception points (TRPs)) 110-1 and 110-2, where the UE1 120 is sending UL transmissions to base station 110-1 and is receiving DL transmissions from base station 110-2. In the example 300 of FIG. 3A, full duplex is enabled for the UE1 120, but not for the base stations 110-1, 110-2. The example 310 of FIG. 3B includes two UEs, shown as UE1 120-1 and UE2 120-2, and a full duplex base station 110, where the UE1 120-1 is receiving a DL transmission from the base station 110 and the UE2 120-2 is transmitting an UL transmission to the base station 110. In the example 310 of FIG. 3B, full duplex is enabled for the base station 110, but not for UE1 120-1 and UE2 120-2. The example 320 of FIG. 3C includes a UE1 120 and a base station 110, where the UE1 120 is receiving a DL transmission from the base station 110 and the UE1 120 is transmitting an UL transmission to the base station 110. In the example 320 of FIG. 3C, full duplex is enabled for both the UE1 120 and the base station 110.

In some cases, interference may result due to communications by two base stations, such as base station 110-1 and base station 110-2, that are located within the same area. For example, cross link interference (CLI) may occur (e.g., due to leakage) between communications by the base station 110-1 and 110-2 in the same frequency band. Additionally, or alternatively, interference may result due to communications by two UEs, such as UE 120-1 and UE 120-2, that are located within the same area. For example, CLI may occur (e.g., due to leakage) between communications by the UEs 120-1 and 120-2 in the same frequency band. As described in more detail below, one or more of the base stations 110 may be configured to communicate using full duplex communications.

As indicated above, FIGS. 3A-3C are provided as one or more examples. Other examples may differ from what is described with regard to FIGS. 3A-3C.

Figure 4:
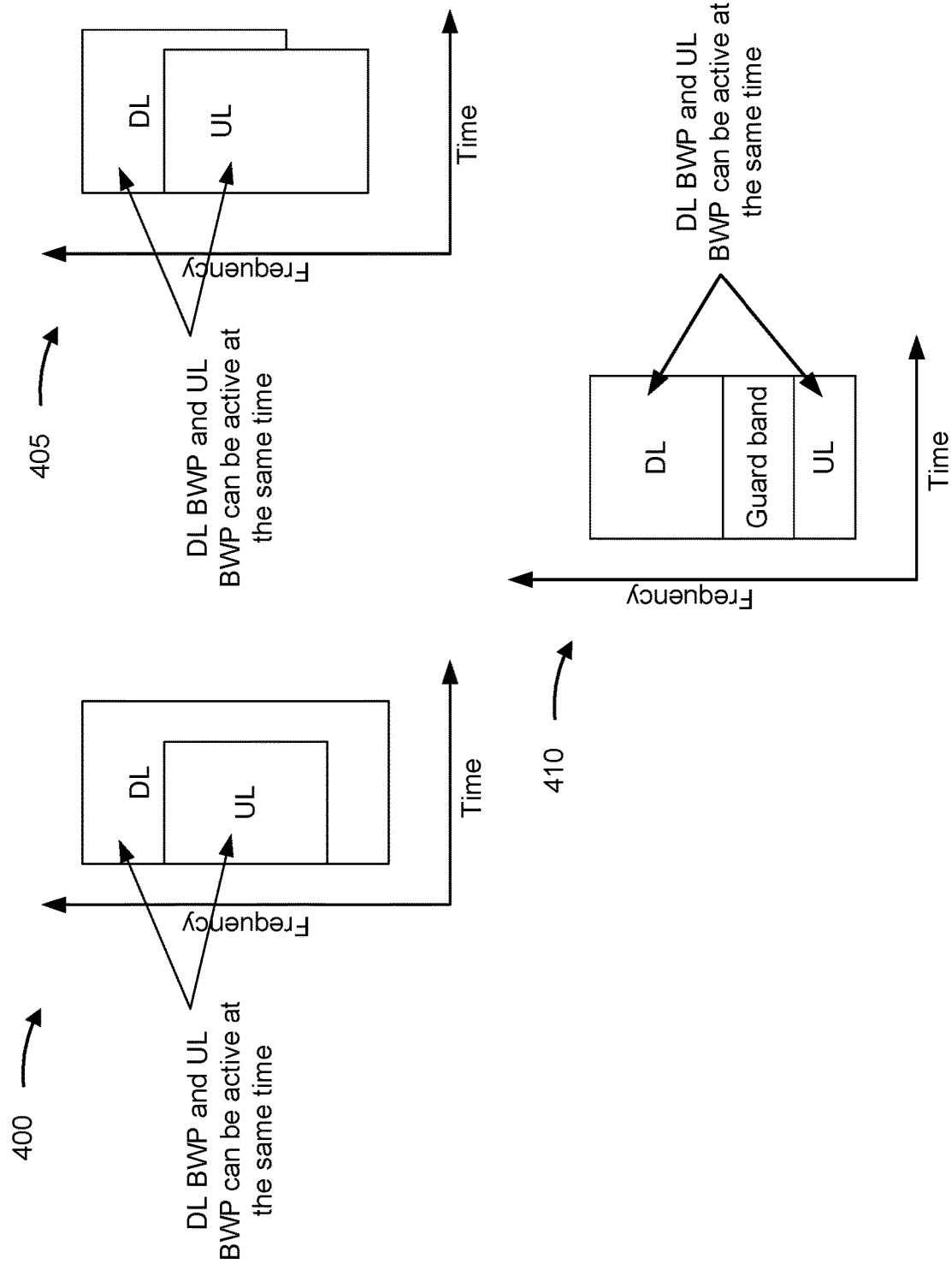
FIG. 4 is a diagram illustrating an example of full duplex communication in a wireless network, in accordance with the present disclosure.

FIG. 4 is a diagram illustrating examples 400, 405, and 410 of full duplex communication in a wireless network, in accordance with the present disclosure.

As shown in FIG. 4, examples 400 and 405 show examples of in-band full duplex (IBFD) communication where UL subband fully overlaps with the DL subband. In IBFD, the UE 120 may transmit an uplink communication to the base station 110 and receive a downlink communication from the base station 110 on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full duplex (SBFD) communication. In SBFD, the UE 120 may transmit an uplink communication to a base station 110 and receive a downlink communication from the base station 110 at the same time, but on different frequency resources. The different frequency resources may be sub-bands of a frequency band, such as a time division duplexing band. In some cases, the frequency resources used for downlink communication may be separated from the frequency resources used for uplink communication, in the frequency domain, by a guard band.

In some cases, the base station 110 may be configured to communicate using SBFD, while the UE 120 may only be configured to communicate using half duplex. Thus, the UE 120 may not be able to determine which resources (e.g., slots or symbols) will be used by the base station 110 for SBFD communications. Further, for each of the SBFD resources, the UE 120 may not be able to determine which frequencies (e.g., which frequency sub-bands) of the SBFD resource are being used for uplink communications, and which frequencies of the SBFD resource are being used for downlink communications. This may result in communications between the UE 120 and the base station 110 being lost or otherwise not properly received.

Techniques and apparatuses are described herein for FD pattern indication. In some aspects, a UE may receive an indication of a time domain pattern for a plurality of resources that includes one or more FD resources (e.g., SBFD resources). For example, the time domain pattern may indicate which of the plurality of resources are SBFD resources, and which of the plurality of resources are legacy resources, such as uplink resources or downlink resources. In some aspects, the time domain pattern may be a bitmap that includes a plurality of bits. Each bit may correspond to a particular resource, and a first state of the bit may indicate that the resource is an SBFD resource, while a second state of the bit may indicate that the resource is a non-SBFD resource. The time resource may refer to a symbol, consecutive symbols, a slot or consecutive slots. In some aspects, the time domain pattern may indicate a number of consecutive SBFD resources, and may indicate one or more anchor slots and one or more transition slots. In some aspects, the UE may receive an indication of a frequency resource allocation for the one or more SBFD resources. For example, the indication of the frequency resource allocation may indicate a first set of frequency sub-bands for performing uplink communications in the SBFD resource and a second set of frequency sub-bands for performing downlink communications in the SBFD resource. The UE may communicate with the base station in accordance with the indication of the time domain pattern. While the FD resources are described herein as SBFD resources, the FD resources may be other types of FD resources, such as IBFD resources.

As described above, the base station may be configured to communicate using SBFD, while the UE may only be configured to communicate using half duplex. Thus, the UE may not be able to determine which resources are SBFD resources, and may not be able to determine the frequency allocation for each of the resources that are SBFD resources. Using the techniques and apparatuses described herein, the UE may receive an indication of a time domain pattern that indicates whether a resource is an SBFD resource or a legacy resource (e.g., an uplink or downlink resource). Further, the UE may receive an indication of a frequency allocation, for the SBFD resources, that indicates the frequencies for performing uplink communications and the frequencies for performing downlink communications within the SBFD resource. Thus, the UE and the base station may communicate using the SBFD resources, while reducing the likelihood of lost or corrupted communications.

As indicated above, FIG. 4 is provided as an example. Other examples may differ from what is described with respect to FIG. 4.

Figure 5:
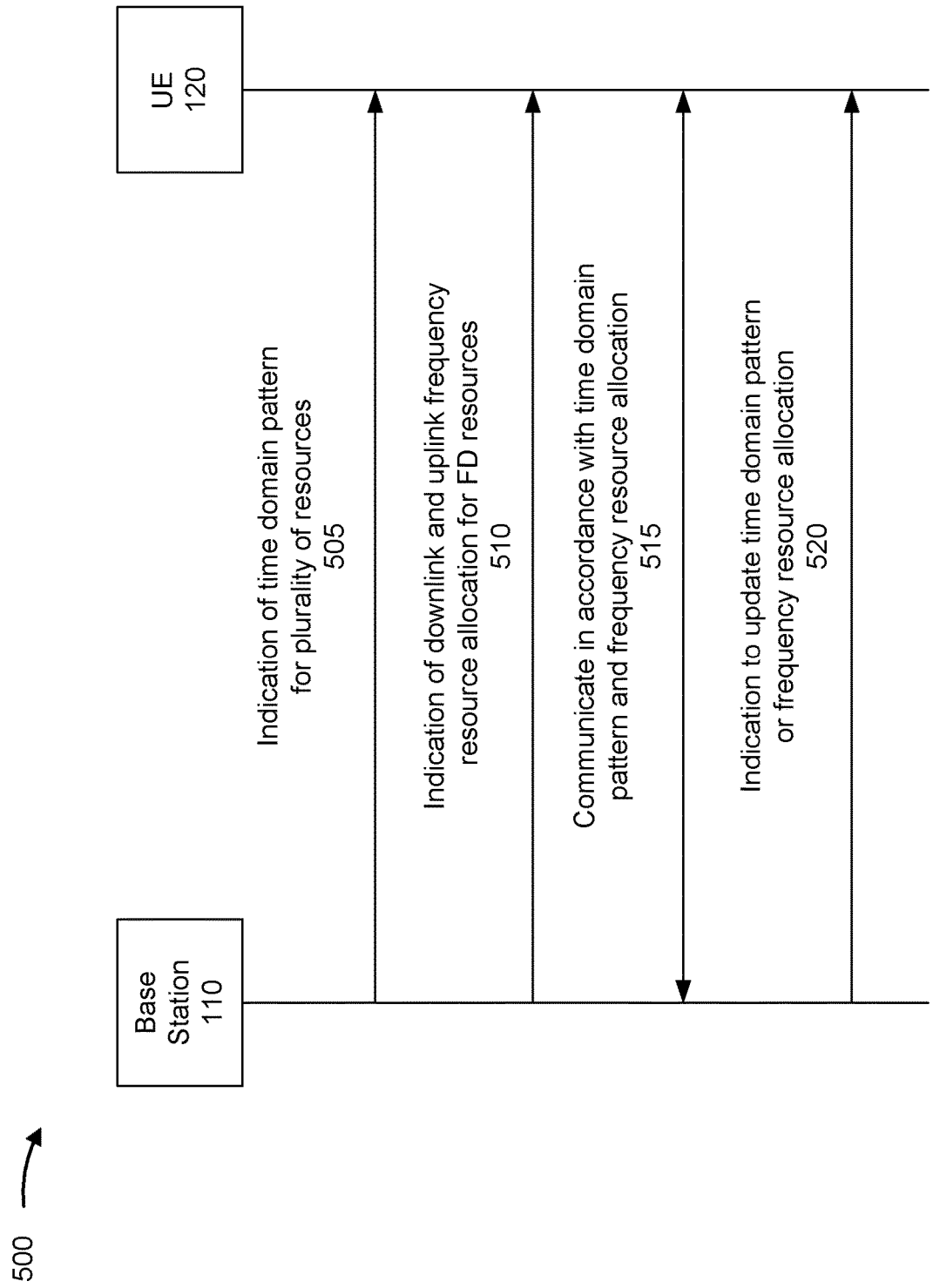
FIG. 5 is a diagram illustrating an example associated with sub-band full duplex (SBFD) pattern indication, in accordance with the present disclosure.

FIG. 5 is a diagram illustrating an example 500 of FD pattern indication, such as SBFD pattern indication, in accordance with the present disclosure. A UE, such as the UE 120, may communicate with a base station, such as the base station 110. While the FD resources are described herein as SBFD resources, the FD resources may be other types of FD resources, such as IBFD resources.

As shown in connection with reference number 505, the base station 110 may transmit, and the UE 120 may receive, an indication of a time domain pattern for a plurality of resources. The plurality of resources may include one or more legacy resources (e.g., uplink resources and/or downlink resources) and one or more SBFD resources.

In some aspects, the base station 110 may be configured to communicate using SBFD communications. Thus, for a given resource (e.g., for a given slot or symbol), the base station 110 operating in an SBFD mode may be configured to perform uplink communications, downlink communications, or simultaneous uplink and downlink communications. For example, the base station 110 may be configured to receive information on an uplink resource, transmit information on a downlink resource, or receive and transmit information on different frequencies (e.g., different frequency sub-bands) of an SBFD resource.

In some aspects, the UE 120 may be configured to communicate using half duplex communications. Thus, the UE 120 operating in the half duplex mode may be configured to perform uplink communications or downlink communications. For example, the UE 120 may be configured to transmit information on an uplink resource, or receive information on a downlink resource. The UE 120 may not be able to perform simultaneous uplink and downlink communications. In some aspects, the UE 120 may not be able to properly detect the resources that will be used by the base station 110 as SBFD resources. Additionally, or alternatively, the UE 120 may not be able to determine which frequency sub-bands of the SBFD resource to use for transmitting information, and which frequency sub-bands of the SBFD resource to use for receiving information.

In some aspects, the indication of the time domain pattern (e.g., the time domain pattern indication) may indicate a time domain pattern for a plurality of resources that include legacy resources and SBFD resources. For example, the time domain pattern indication may indicate a pattern (e.g., a sequence) of uplink resources, downlink resources, TDD resources, and/or SBFD resources, among other examples. In some aspects, the time domain pattern indication may be received from the base station 110. In some aspects, the time domain pattern indication may be received via higher layer signaling, such as via a radio resource control (RRC) message. For example, the time domain pattern indication may be received via a TDD-UL-DL-subband-pattern indication.

In some aspects, the time domain pattern indication may be a bitmap, or may include a bitmap indication. The bitmap may include a plurality of bits. Each bit, of the plurality of bits, may correspond to a resource (e.g., a slot or a symbol) that is used for communications between the UE 120 and the base station 110. In some aspects, a first state of the bit (e.g., "0") may indicate that the bit is a legacy resource, and a second state of the bit (e.g., "1") may indicate that the bit is an SBFD resource. Additional details regarding the bitmap indication are described below in connection with FIG. 6.

In some aspects, the time domain pattern indication may include a consecutive resource indication. For example, the consecutive resource indication may indicate a number of consecutive legacy resources and a number of consecutive SBFD resources, among other examples. In some aspects, the consecutive resource indication may indicate a number of anchor resources (e.g., TDD resources) and a number of transition resources (e.g., TDD resources and SBFD resources). Additional details regarding the consecutive resource indication are described below in connection with FIGS. 7-9.

As shown in connection with reference number 510, the base station 110 may transmit, and the UE 120 may receive, an indication of a frequency resource allocation for one or more SBFD resources. As described above, the UE 120 may not be able to determine whether to perform an uplink transmission, or a downlink reception, during the time period of the SBFD resource. For example, the UE 120 may detect an SBFD slot for communicating with the base station 110, and may not be able to determine whether the UE 120 should transmit information, or receive information, for the duration of the SBFD slot.

In some aspects, the indication of the frequency resource allocation (e.g., the frequency resource allocation indication) may indicate the uplink and downlink frequency sub-bands within the SBFD resources. For example, the frequency resource allocation indication may indicate a first set of frequencies (e.g., a first frequency sub-band) in the SBFD resource that are used for uplink communications, and a second set of frequencies (e.g., a second frequency sub-band) in the SBFD resource that are used for downlink communications. In some aspects, the frequency resource allocation indication may be received from the base station 110 via higher layer signaling, such as via an RRC message. For example, the frequency resource allocation indication may be received via a UL-DL-subband-frequency-resources indication. Additional details regarding the frequency resource allocation indication are described below in connection with FIG. 6.

As shown in connection with reference number 515, the UE 120 and the base station 110 may communicate in accordance with the time domain pattern indication and/or the frequency resource allocation indication. As described above, the base station 110 may be configured to communicate using SBFD, while the UE 120 may be configured to communicate using half duplex. Using the time domain pattern indication, the base station 110 may indicate, to the UE 120, one or more SBFD resources and one or more legacy resources for communications between the base station 110 and the UE 120. Further, using the frequency resource allocation indication, the base station 110 may indicate, to the UE 120, one or more frequency sub-bands in the SBFD resource for performing uplink communications, and one or more frequency sub-bands in the SBFD for performing downlink communications. The UE 120 may transmit information to the base station 110, or receive information from the base station 110, in accordance with the time domain pattern indication and/or the frequency resource allocation indication. For example, the UE 120 may transmit information using an uplink resource, or using an uplink frequency sub-band of the SBFD resource. Additionally, or alternatively, the UE 120 may receive information using a downlink resource, or using a downlink frequency sub-band of the SBFD resource.

As shown in connection with reference number 520, the base station 110 may transmit, and the UE 120 may receive, an indication to update the time domain pattern for the plurality of resources. In some aspects, the indication to update the time domain pattern (e.g., the update indication) may indicate to change the pattern of the plurality of resources. For example, the update indication may indicate to change a resource, in the sequence of resources, from a first type of resource (e.g., a legacy resource) to a second type of resource (e.g., an SBFD resource) or vice versa. In some aspects, the update indication may indicate a change a resource, in the sequence of resource, from a flexible resource to legacy TDD resource or SBFD resource.

In some aspects, the update indication may be an indication to update the bitmap pattern indication. For example, the update indication may indicate to update a bit, of the bitmap, from a "0" state (e.g., a legacy resource) to a "1" state (e.g., an SBFD resource). In some aspects, the update indication may be an indication to update the consecutive resource pattern indication. For example, the update indication may indicate to change the number of consecutive resources, such as to increase the periodicity of the SBFD resources, in the sequence of resources, from six resources to eight resources.

In some aspects, the update indication may be an indication to update the frequency resource allocation. For example, the update indication may indicate to change a frequency sub-band from an uplink frequency sub-band to a downlink frequency sub-band. In some aspects, as described in more detail below in connection with FIG. 6, the UE 120 may be configured with multiple frequency resource allocation configurations, and the update indication may indicate for the UE 120 to switch from a first frequency resource allocation configuration to a second frequency resource allocation configuration.

In some aspects, the update indication may be transmitted and received via downlink control information (DCI). In some aspects, the update indication may be transmitted and received via a modified (e.g., enhanced) DCI format 2_0. DCI format 2_0 may be used for notifying the UE 120 of the slot format for a combination of slots. For example, the update indication may be transmitted and received via one or more additional bits (or repurposed bits within the DCI payload) that are added to the DCI format 2_0. The one or more additional bits may be added to indicate the frequency sub-bands of the SBFD resource. In some aspects, the update indication may be transmitted and received via a new DCI format, such as a DCI format 2_x. In some aspects, the update indication may be transmitted and received via a medium access control (MAC) message, such as a MAC control element (MAC-CE).

As described above, the base station 110 may be configured to communicate using SBFD, while the UE 120 may only be configured to communicate using half duplex. Thus, the UE 120 may not be able to determine which resources are SBFD resources, and may not be able to determine the frequency allocation for each of the resources that are SBFD resources. Using the techniques and apparatuses described herein, the UE 120 may receive an indication of a time domain pattern that indicates whether a resource is an SBFD resource or a legacy resource (e.g., an uplink or downlink resource). Further, the UE 120 may receive an indication of a frequency allocation, for the SBFD resources, that indicates the frequencies for performing uplink communications and the frequencies for performing downlink communications within the SBFD resource. Thus, the UE 120 and the base station 110 may communicate using the SBFD resources, while reducing the likelihood of lost or corrupted communications.

As indicated above, FIG. 5 is provided as an example. Other examples may differ from what is described with respect to FIG. 5. For example, while the FD resources are described herein as SBFD resources, the FD resources may be other types of FD resources, such as IBFD resources.

Figure 6:
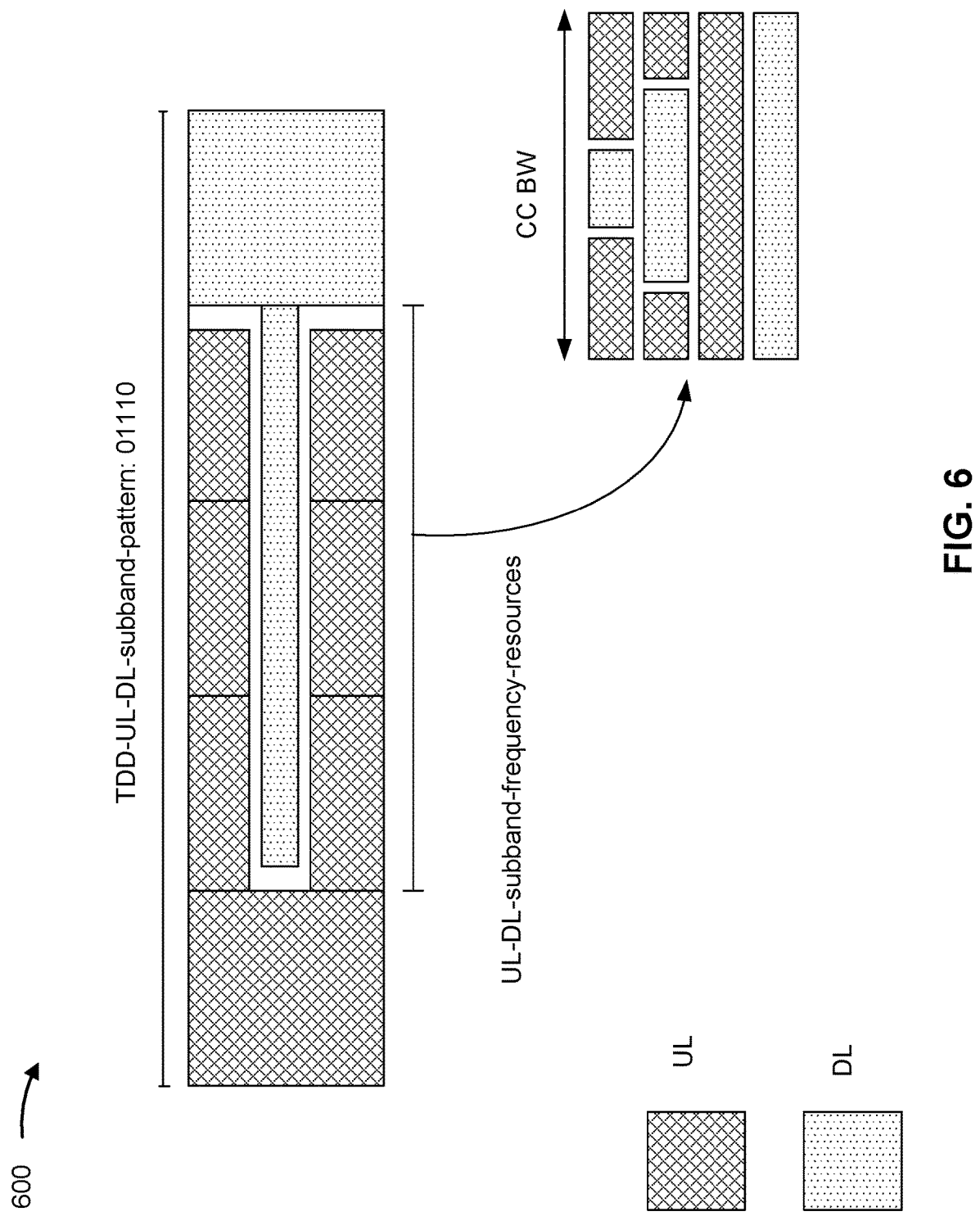
FIG. 6 is a diagram illustrating an example associated with a bitmap pattern indication, in accordance with the present disclosure.

FIG. 6 is a diagram illustrating an example 600 of a bitmap indication, in accordance with the present disclosure. As shown, a bitmap may include a plurality of bits. Each bit, of the plurality of bits, may correspond to a resource for communications between the UE 120 and the base station 110. For example, each bit may correspond to a slot for communications between the UE 120 and the base station 110, or a symbol for communications between the UE 120 and the base station 110. A first state of a bit, of the plurality of bits, may indicate a first type of resource, and a second state of the bit may indicate a second type of resource. For example, a "0" state of the bit may indicate that the resource is a legacy resource (e.g., an uplink resource or a downlink resource) and a "1" state of the bit may indicate that the resource is an SBFD resource.

In the example 600, the bitmap includes the bits 01110. For example, the UE 120 may receive a TDD-UL-DL-subband-pattern indication, via an RRC message, that indicates the following bits of the bitmap: 01110. Thus, the bitmap may indicate that the time domain pattern for the plurality of resources includes a first legacy resource (e.g., an uplink resource), three SBFD resources, and a second legacy resource (e.g., a downlink resource). In some aspects, the bitmap may indicate a sequence of repeating resources. Thus, the UE 120 may communicate with the base station 110 in accordance with the repeating sequence of the resources, as indicated in the bitmap.

In some aspects, the UE 120 may be configured with a plurality of frequency resource allocation configurations. In some aspects, a particular frequency resource allocation, of the plurality of frequency resource allocations, may be the default frequency resource allocation configuration. As shown in the example 600, the UE 120 may be configured with four frequency resource allocation configurations. When the UE 120 detects an SBFD resource, the UE 120 may communicate with the base station 110 in accordance with one of the frequency resource allocation configurations, such as the default frequency resource allocation configuration. For example, the UE 120 may perform uplink communications in a first frequency sub-band of the SBFD resource, downlink communications in a second frequency sub-band of the SBFD resource, and uplink communications in a third frequency sub-band of the SBFD resource.

In some aspects, the UE 120 may receive an indication (e.g., the update indication) to switch between a first frequency resource allocation configuration and a second frequency resource allocation configuration. For example, the UE 120 may receive a UL-DL-subband-frequency-resources indication (e.g., via L1/DCI or L2/MAC-CE) that indicates to switch between the default frequency resource allocation configuration and a second frequency resource allocation configuration. After receiving the update indication, the UE 120 may communicate with the base station 110, in an SBFD resource, in accordance with the second frequency resource allocation configuration.

As indicated above, FIG. 6 is provided as an example. Other examples may differ from what is described with respect to FIG. 6.

Figure 7:
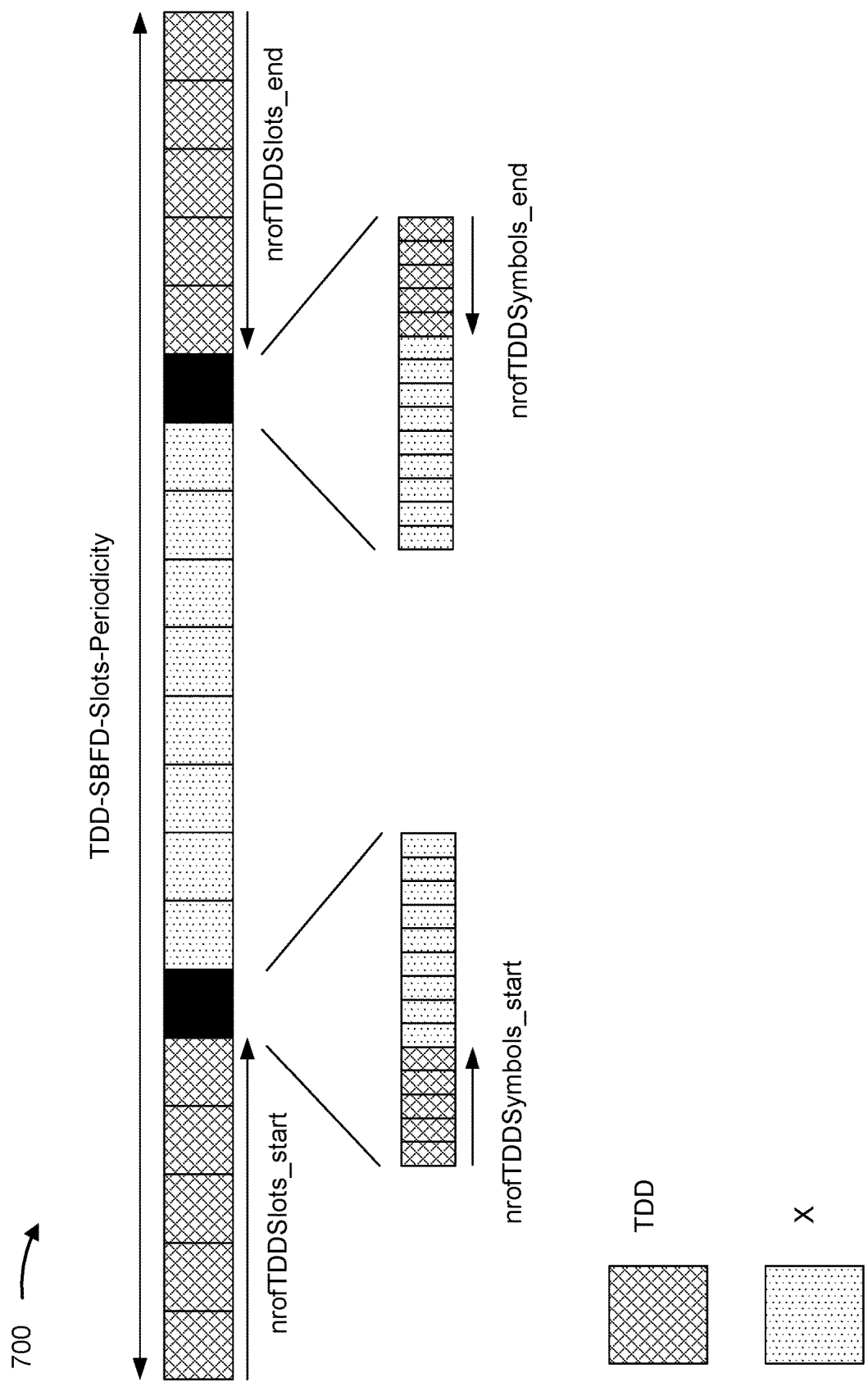
FIG. 7 is a diagram illustrating a first example associated with a consecutive resource pattern indication, in accordance with the present disclosure.

FIG. 7 is a diagram illustrating a first example 700 of a consecutive resource indication, in accordance with the present disclosure. As shown, the UE 120 may communicate with a base station 110 using a number of resources. While the example 700 shows a sequence of twenty resources for communications between the UE 120 and the base station 110, any number of resources may be used, and/or the sequence of resources may repeat indefinitely or for a certain period.

As shown in the example 700, the consecutive resource indication may indicate a number of consecutive resources (the "X" flexible resources) that can be either TDD resources or SBFD resources. For example, the TDD-SBFD-Slots-Periodicity indication may indicate eight consecutive X resources. Thus, there may be eight consecutive resources that can be either TDD resources or SBFD resources.

In some aspects, the UE 120 may receive signaling (e.g., lower layer signaling) that indicates whether the X resources should be TDD resources or SBFD resources. For example, the UE 120 may receive DCI, such as the enhanced DCI format2_0 or a new DCI format 2_x, that indicates whether the X resources should be the TDD resources or the SBFD resources. Alternatively, the UE 120 may receive a MAC-CE that indicates whether the X resources should be the TDD resources or the SBFD resources.

In some aspects, the consecutive resource indication may include an anchor indication and/or a transition indication. In some aspects, the anchor indication and/or the transition indication may be transmitted and received separately from the consecutive resource indication.

In some aspects, the anchor indication may indicate a number of anchor resources at a beginning of the sequence of resources, and/or a number of anchor resources at an end of the sequence of resources. For example, the nrofTDD-Slots_start indication may indicate a first (e.g., an initial) number of anchor resources, and the nrofTDDSlots_end indication may indicate a second (e.g., a final) number of anchor resources. In this example, the anchor resources are TDD resources. However, the anchor resources are not limited to being TDD resources, and may be any type of resource.

In some aspects, the transition indication may indicate one or more symbols in a transition slot. In some aspects, the transition indication may indicate a first set of one or more first types of symbols, and a second set of one or more second types of symbols. For example, the transition indication may indicate a first set of symbols that have the same resource format as the anchor slots, and a second set of symbols that have the same resource format as the consecutive resource slots (e.g., the X slots). In some examples, the nrofTDDSymbols_start indication may indicate that first five symbols having the TDD resource format, followed by nine symbols having the X resource format. Additionally, or alternatively, the nrofTDDSymbols_end indication may indicate that last five symbols having the TDD resource format and the remaining first nine symbols having the X resource format. In some aspects, a first transition slot may be located between the first set of anchor slots and the set of consecutive resource slots, and a second transition slot may be located between the set of consecutive resource slots and the second set of anchor slots. Although this example, and other examples, describe a slot having fourteen symbols, the slot may have any number of symbols, and the indication (e.g., n_TDD_symbols) may indicate the number of TDD symbols.

In some aspects, as described above, the UE 120 may receive a signaling indication (e.g., lower layer signaling) that indicates to change the resource pattern. For example, the UE 120 may receive DCI, such as the enhanced DCI_2 or the DCI_3, that indicates to change the resource pattern. In some aspects, the signaling indication may indicate to change the periodicity of the consecutive resource slots. For example, the signaling indication may indicate to change the periodicity of the X slots from eight slots to six slots. Additionally, or alternatively, the signaling indication may indicate to change the periodicity of one or more other slots in the sequence of slots. In some aspects, the signaling indication may indicate for the UE 120 to switch between one or more stored configurations. For example, the signaling indication may indicate for the UE 120 to switch between a first configuration that includes ten anchor slots, two transition slots, and eight X slots, to a second configuration that includes twelve anchor slots, two transition slots, and six X slots. In some aspects, one or more patterns may be defined using the above resource structure, and the one or more patterns may be concatenated.

As indicated above, FIG. 7 is provided as an example. Other examples may differ from what is described with respect to FIG. 7.

Figure 8:
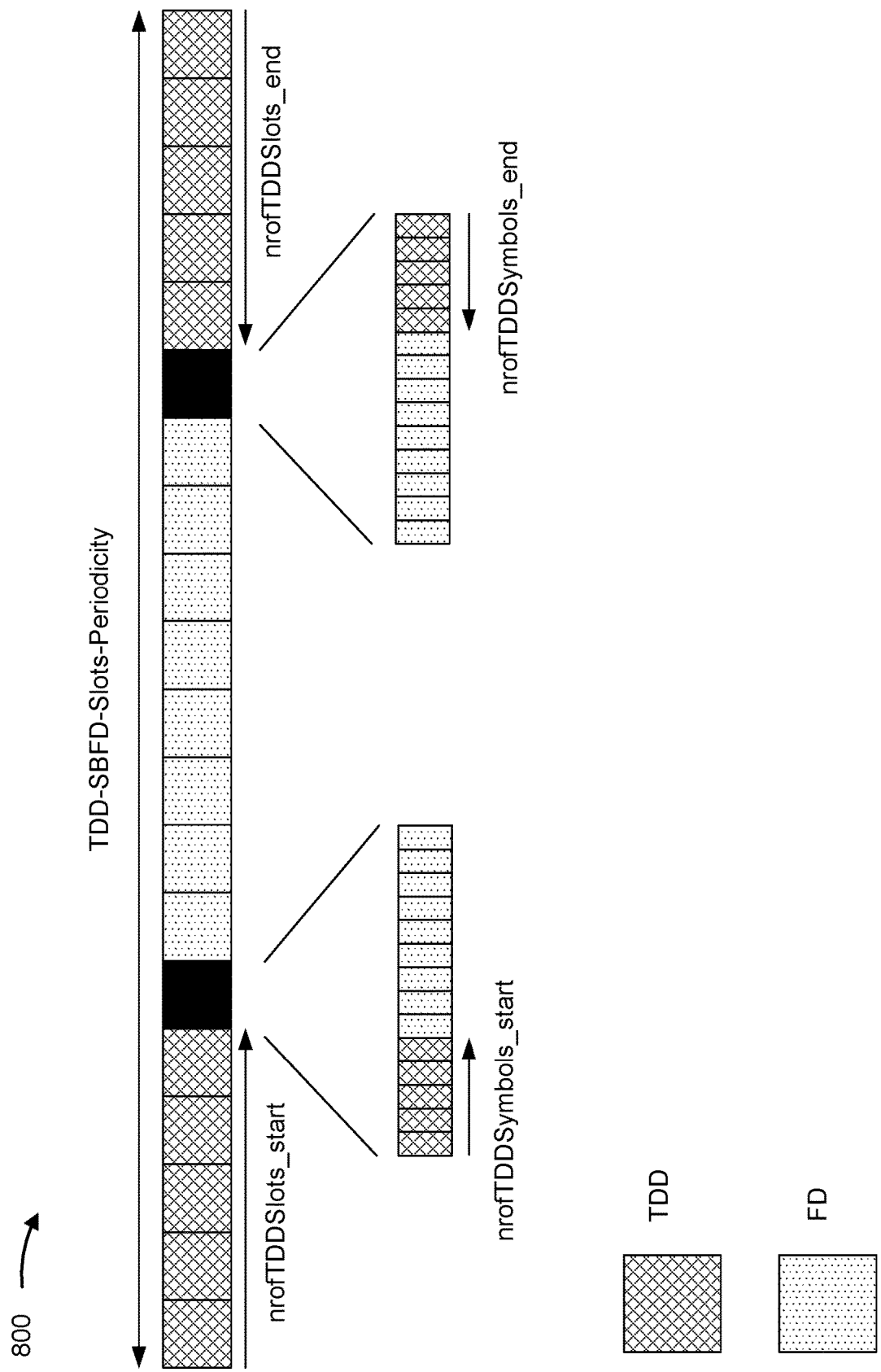
FIG. 8 is a diagram illustrating a second example associated with a consecutive resource pattern indication, in accordance with the present disclosure.

FIG. 8 is a diagram illustrating a second example 800 of a consecutive resource indication, in accordance with the present disclosure. As shown, the UE 120 may communicate with a base station 110 using a number of resources. While the example 800 shows a sequence of twenty resources for communications between the UE 120 and the base station 110, any number of resources may be used, and/or the sequence of resources may repeat indefinitely or for a certain period.

As shown in the example 800, the consecutive resource indication may indicate a number of consecutive resources (e.g., FD resources). For example, the TDD-SBFD-Slots-Periodicity indication may indicate eight consecutive FD resources. Thus, there may be eight consecutive resources that are FD resources.

In some aspects, the consecutive resource indication may include an anchor indication and/or a transition indication. In some aspects, the anchor indication and/or the transition indication may be transmitted and received separately from the consecutive resource indication.

In some aspects, the anchor indication may indicate a number of anchor resources at a beginning of the sequence of resources, and/or a number of anchor resources at an end of the sequence of resources. For example, the nrofTDD-Slots_start indication may indicate a first (e.g., an initial) number of anchor resources, and the nrofTDDSlots_end indication may indicate a second (e.g., a final) number of anchor resources. In this example, the anchor resources are TDD resources. However, the anchor resources are not limited to being TDD resources, and may be any type of resource.

In some aspects, the transition indication may indicate one or more symbols in a transition slot. In some aspects, the transition indication may indicate a first set of one or more first types of symbols, and a second set of one or more second types of symbols. For example, the transition indication may indicate a first set of symbols that have the same resource format as the anchor slots, and a second set of symbols that have the same resource format as the consecutive resource slots (e.g., the FD slots). In some aspects, the nrofTDDSymbols_start indication may indicate five symbols having the TDD resource format, followed by nine symbols having the FD resource format. Additionally, or alternatively, the nrofTDDSymbols_end indication may indicate nine symbols having the FD resource format, followed by five symbols having the TDD resource format. In some aspects, a first transition slot may be located between the first set of anchor slots and the set of consecutive resource slots, and a second transition slot may be located between the set of consecutive resource slots and the second set of anchor slots.

In some aspects, as described above, the UE 120 may receive a signaling indication (e.g., lower layer signaling) that indicates to change the resource pattern. For example, the UE 120 may receive DCI, such as the enhanced DCI_2 or the DCI_3, that indicates to change the resource pattern. In some aspects, the signaling indication may indicate to change the periodicity of the consecutive resource slots. For example, the signaling indication may indicate to change the periodicity of the FD slots from eight slots to six slots. Additionally, or alternatively, the signaling indication may indicate to change the periodicity of one or more other slots in the sequence of slots. In some aspects, the signaling indication may indicate for the UE 120 to switch between one or more stored configurations. For example, the signaling indication may indicate for the UE 120 to switch between a first configuration that includes ten anchor slots, two transition slots, and eight FD slots, to a second configuration that includes twelve anchor slots, two transition slots, and six FD slots. In some aspects, one or more patterns may be defined using the above resource structure, and the one or more patterns may be concatenated.

As indicated above, FIG. 8 is provided as an example. Other examples may differ from what is described with respect to FIG. 8.

Figure 9:
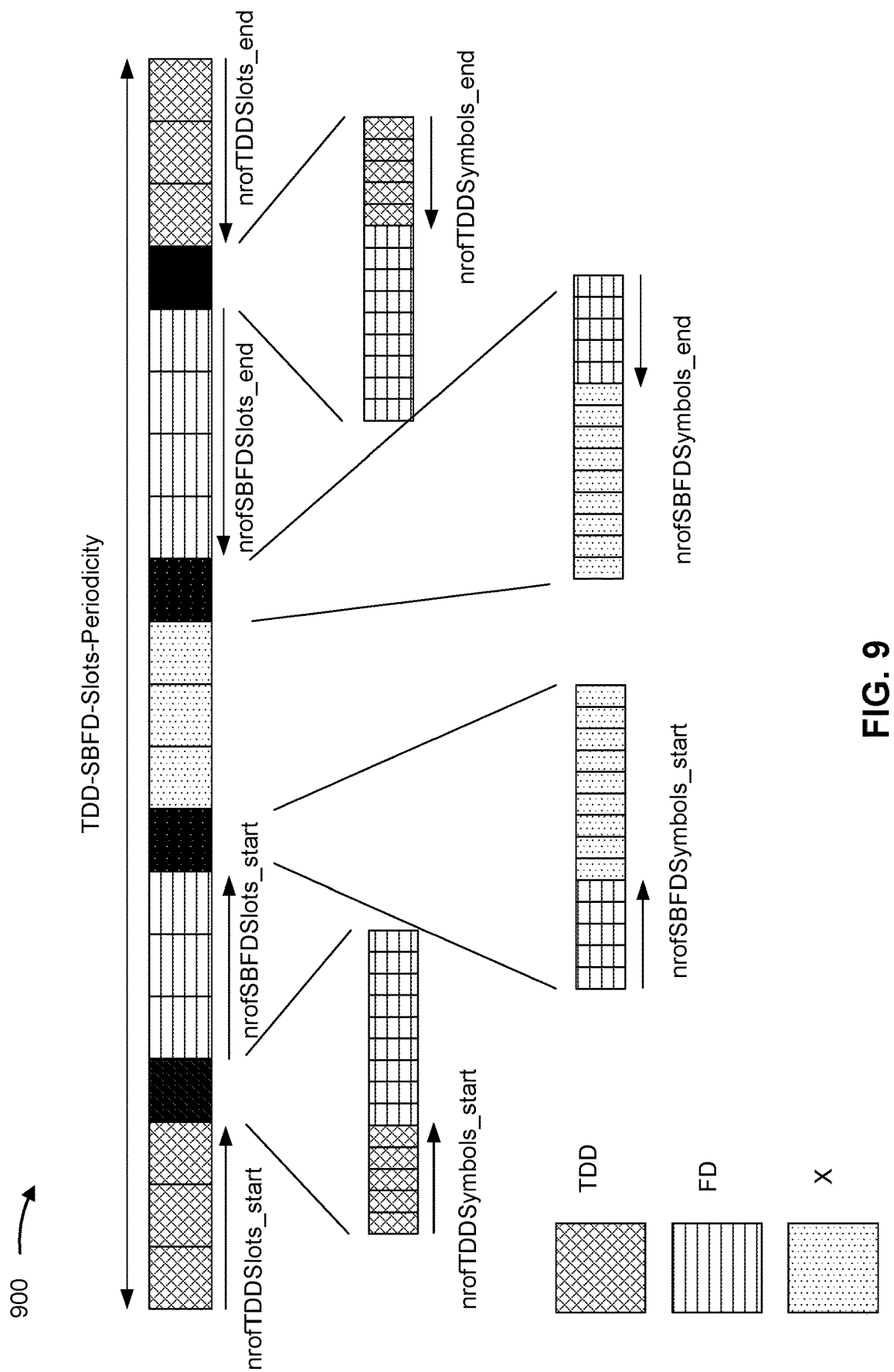
FIG. 9 is a diagram illustrating a third example associated with a consecutive resource pattern indication, in accordance with the present disclosure.

FIG. 9 is a diagram illustrating a third example 900 of a consecutive resource indication, in accordance with the present disclosure. As shown, the UE 120 may communicate with a base station 110 using a number of resources. While the example 900 shows a sequence of twenty resources for communications between the UE 120 and the base station 110, any number of resources may be used, and/or the sequence of resources may repeat indefinitely or for a certain period.

As shown in the example 900, the consecutive resource indication may indicate a number of consecutive resources (the "X" resources) that can be either TDD resources or SBFD resources. For example, the TDD-SBFD-Slots-Periodicity indication may indicate three consecutive X resources. Thus, there may be three consecutive resources that can be either TDD resources or SBFD resources.

In some aspects, the UE 120 may receive signaling (e.g., lower layer signaling) that indicates whether the X resources should be TDD resources or SBFD resources. For example, the UE 120 may receive DCI, such as the enhanced DCI format 2_0 or the new DCI format_2_x, that indicates whether the X resources should be the TDD resources or the SBFD resources. Alternatively, the UE 120 may receive a MAC-CE that indicates whether the X resources should be the TDD resources or the SBFD resources.

In some aspects, the consecutive resource indication may include an anchor indication, a transition indication, and/or an FD resource indication. In some aspects, the anchor indication, the transition indication, and/or the FD resource indication may be transmitted and received separately from the consecutive resource indication.

In some aspects, the anchor indication may indicate a number of anchor resources at a beginning of the sequence of resources, and/or a number of anchor resources at an end of the sequence of resources. For example, the nrofTDDSlots_start indication may indicate a first (e.g., an initial) number of anchor resources, and the nrofTDDSlots_end indication may indicate a second (e.g., a final) number of anchor resources. In this example, the anchor resources are TDD resources. However, the anchor resources are not limited to being TDD resources, and may be any type of resource.

In some aspects, the transition indication may indicate one or more symbols in a transition slot. In some aspects, the transition indication may indicate a first set of one or more first types of symbols, and a second set of one or more second types of symbols. For example, the transition indication may indicate a first set of symbols that have the same resource format as the anchor slots, and a second set of symbols that have the same resource format as the FD resource slots. In some aspects, the nrofTDDSymbols_start indication may indicate five symbols having the TDD resource format, followed by nine symbols having the FD resource format. Additionally, or alternatively, the nrofTDDSymbols_end indication may indicate nine symbols having the FD resource format, followed by five symbols having the TDD resource format. In some aspects, a first transition slot may be located between the first set of anchor slots and the first set of FD resource slots, and a second transition slot may be located between the second set of FD resource slots and the second set of anchor slots.

In some aspects, the FD resource indication may indicate a number of FD resource slots. For example, the nforSBFDSlots_Start indication may indicate three FD slots that are located between the first transition slot and the number of consecutive X slots, and the nrofSBFDSlots_end indication may indicate four FD slots that are located between the number of consecutive X slots and the second transition slot.

In some aspects, as described above, the UE 120 may receive a signaling indication (e.g., lower layer signaling) that indicates to change the resource pattern. For example, the UE 120 may receive DCI, such as the enhanced DCI_2 or the DCI_3, that indicates to change the resource pattern. In some aspects, the signaling indication may indicate to change the periodicity of the consecutive resource slots. For example, the signaling indication may indicate to change the periodicity of the X slots from three slots to five slots. Additionally, or alternatively, the signaling indication may indicate to change the periodicity of one or more other slots in the sequence of slots. In some aspects, the signaling indication may indicate for the UE 120 to switch between one or more stored configurations. For example, the signaling indication may indicate for the UE 120 to switch between a first configuration that includes six anchor slots, four transition slots, seven FD slots, and three X slots, to a second configuration that includes eight anchor slots, four transition slots, five FD slots, and three X slots. In some aspects, one or more patterns may be defined using the above resource structure, and the one or more patterns may be concatenated.

As indicated above, FIG. 9 is provided as an example. Other examples may differ from what is described with respect to FIG. 9.

Figure 10:
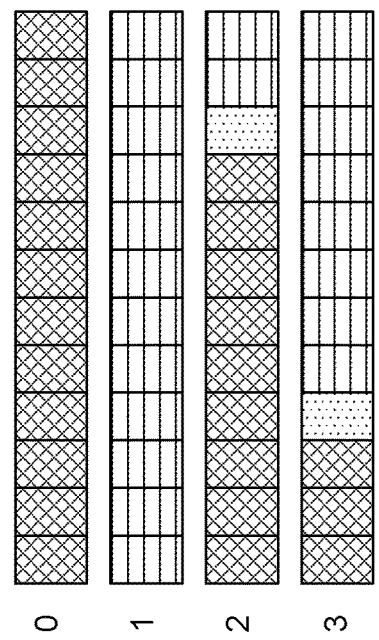
FIG. 10 is a diagram illustrating an example associated with a resource type combination, in accordance with the present disclosure.
Figure 10:
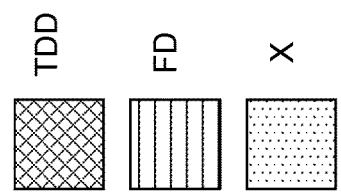

FIG. 10 is a diagram showing an example 1000 of resource type combination, in accordance with the present disclosure. In some aspects, as described above, the UE 120 may receive a signaling indication that indicates to update a resource type. For example, the UE 120 may receive DCI (e.g., the enhanced DCI_2 or the DCI_3) or a MAC-CE that instructs the UE 120 to update an X resource (e.g., slot) to be a TDD resource or an SBFD resource.

In some aspects, the indication of the resource type may be received as part of an index (e.g., a codepoint) associated with a resource type combination table that is communicated to the UE via higher layers (e.g. RRC). For example, the UE 120 may receive (e.g., from the base station 110 via the DCI or MAC-CE) a slot type combination identifier that indicates a particular slot combination type. The length (e.g., number of bits) of the codepoint may be determined by the maximum number of rows of the configured table and is given by ceil(log 2(#SlotTypesCombination)). In some aspects, the UE 120 may receive a two bit SlotTypeCombinationID that corresponds to a particular SlotTypeCombination for a table that has three configured Slot Type combinations as shown in FIG. 10. Each slot in the slot-Type combination may map to one of the X slots as shown in FIG. 7 and FIG. 8. The UE 120 may be configured to communicate with the base station 110, using the particular slot type combination, based at least in part on the corresponding slot type combination identifier. For example, the UE 120 may communicate with the base station 110 using uplink resources, downlink resources, TDD resources, and/or SBFD resources, among other examples, according to the slot type combination, based at least in part on receiving the corresponding slot type combination identifier.

As indicated above, FIG. 10 is provided as an example. Other examples may differ from what is described with respect to FIG. 10.

Figure 11:
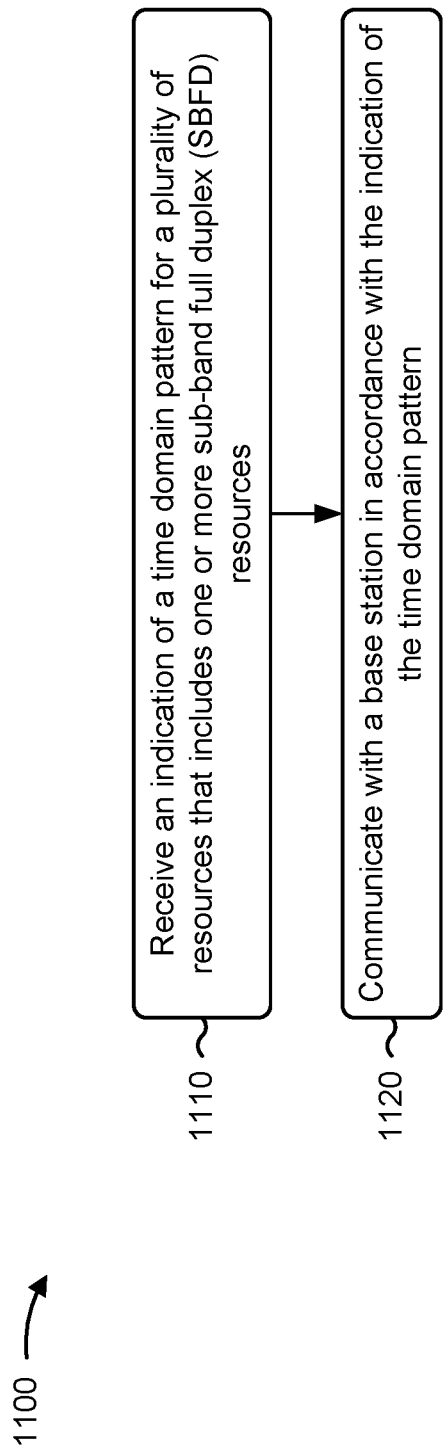
FIG. 11 is a diagram illustrating an example process associated with SBFD pattern indication, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with FD pattern indication. While the FD resources are described herein as SBFD resources, the FD resources may be other types of FD resources, such as IBFD resources.

As shown in FIG. 11, in some aspects, process 1100 may include receiving an indication of a time domain pattern for a plurality of resources that includes one or more SBFD resources (block 1110). For example, the UE (e.g., using communication manager 140 and/or reception component 1302, depicted in FIG. 13) may receive an indication of a time domain pattern for a plurality of resources that includes one or more SBFD resources, as described above.

As further shown in FIG. 11, in some aspects, process 1100 may include communicating with a base station in accordance with the indication of the time domain pattern (block 1120). For example, the UE (e.g., using communication manager 140, reception component 1302 and/or transmission component 1304, depicted in FIG. 13) may communicate with a base station in accordance with the indication of the time domain pattern, as described above.

Process 1100 may include additional aspects, such as any single aspect or any combination of aspects described below and/or in connection with one or more other processes described elsewhere herein.

In a first aspect, the indication of the time domain pattern is received from the base station via a radio resource control message.

In a second aspect, alone or in combination with the first aspect, the indication of the time domain pattern indicates whether each resource, of the plurality of resources, is a first type of resource or a second type of resource, wherein the first type of resource is an SBFD resource and the second type of resource is an uplink resource, a downlink resource, or a flexible resource.

In a third aspect, alone or in combination with one or more of the first and second aspects, the plurality of resources is a plurality of slots for communicating with the base station, or a plurality of symbols for communicating with the base station.

In a fourth aspect, alone or in combination with one or more of the first through third aspects, the indication of the time domain pattern is a bitmap that includes a plurality of bits, wherein each bit of the plurality of bits corresponds to a resource of the plurality of resources.

In a fifth aspect, alone or in combination with one or more of the first through fourth aspects, a first state of a bit, of the plurality of bits, indicates that the resource is an SBFD resource, and a second state of the bit, of the plurality of bits, indicates that the resource is not an SBFD resource.

In a sixth aspect, alone or in combination with one or more of the first through fifth aspects, the indication of the time domain pattern indicates a number of consecutive SBFD resources.

In a seventh aspect, alone or in combination with one or more of the first through sixth aspects, the indication of the time domain pattern further indicates a number of anchor resources and a number of transition resources, wherein the anchor resources are time division duplex (TDD) resources and the transition resources include TDD resources and SBFD resources.

In an eighth aspect, alone or in combination with one or more of the first through seventh aspects, process 1100 includes receiving an indication of a frequency resource allocation for the one or more SBFD resources, wherein the indication of the frequency resource allocation indicates a first set of sub-band frequencies for uplink communications and a second set of sub-band frequencies for downlink communications.

In a ninth aspect, alone or in combination with one or more of the first through eighth aspects, the indication of the frequency resource allocation indicates a plurality of frequency resource allocation configurations, and one of the frequency resource allocation configurations is a default frequency resource allocation configuration.

In a tenth aspect, alone or in combination with one or more of the first through ninth aspects, process 1100 includes receiving an indication to update the time domain pattern, or an indication to switch between a first frequency resource allocation and a second frequency resource allocation, for the one or more SBFD resources.

In an eleventh aspect, alone or in combination with one or more of the first through tenth aspects, the indication to update the time domain pattern, or the indication to switch between the first frequency resource allocation and the second frequency resource allocation, is received via DCI or a MAC message.

In a twelfth aspect, alone or in combination with one or more of the first through eleventh aspects, the base station is configured to perform SBFD communications and the UE is configured to perform half duplex communications.

In a thirteenth aspect, alone or in combination with one or more of the first through twelfth aspects, the indication of the time domain pattern is an indication of a time division duplexing pattern.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
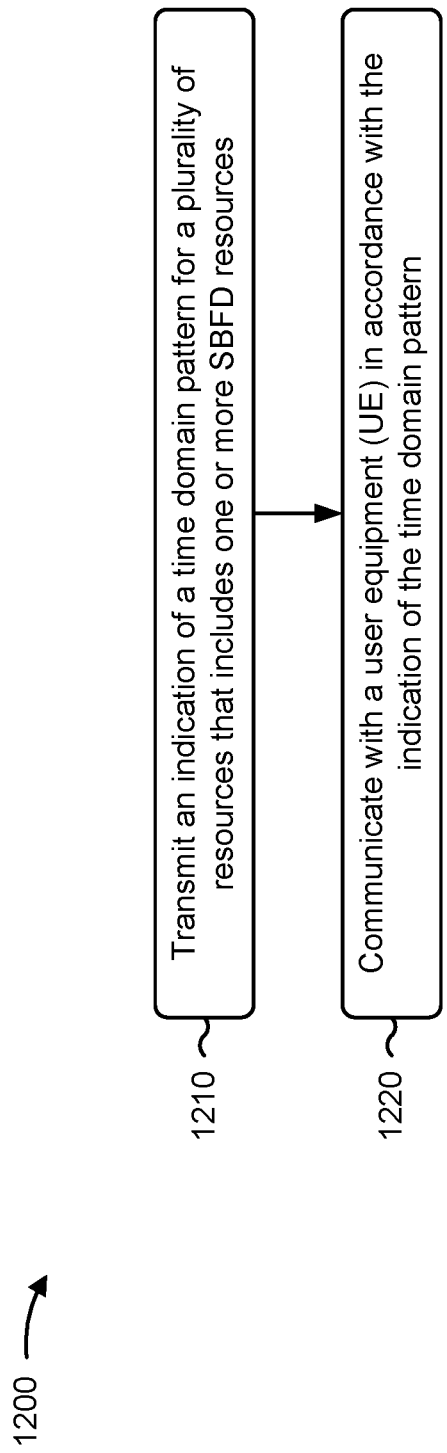
FIG. 12 is a diagram illustrating an example process associated with SBFD pattern indication, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with FD pattern indication. While the FD resources are described herein as SBFD resources, the FD resources may be other types of FD resources, such as IBFD resources.

As shown in FIG. 12, in some aspects, process 1200 may include transmitting an indication of a time domain pattern for a plurality of resources that includes one or more SBFD resources (block 1210). For example, the base station (e.g., using communication manager 150 and/or transmission component 1404, depicted in FIG. 14) may transmit an indication of a time domain pattern for a plurality of resources that includes one or more SBFD resources, as described above.

As further shown in FIG. 12, in some aspects, process 1200 may include communicating with a UE in accordance with the indication of the time domain pattern (block 1220). For example, the base station (e.g., using communication manager 150, reception component 1402 and/or transmission component 1404, depicted in FIG. 14) may communicate with a UE in accordance with the indication of the time domain pattern, as described above.

Process 1200 may include additional aspects, such as any single aspect or any combination of aspects described below and/or in connection with one or more other processes described elsewhere herein.

In a first aspect, transmitting the indication of the time domain pattern comprises transmitting a radio resource control message that includes the indication of the time domain pattern.

In a second aspect, alone or in combination with the first aspect, the indication of the time domain pattern indicates whether each resource, of the plurality of resources, is a first type of resource or a second type of resource, wherein the first type of resource is an SBFD resource and the second type of resource is an uplink resource, a downlink resource, or a flexible resource.

In a third aspect, alone or in combination with one or more of the first and second aspects, the plurality of resources is a plurality of slots for communicating with the UE, or a plurality of symbols for communicating with the UE.

In a fourth aspect, alone or in combination with one or more of the first through third aspects, the indication of the time domain pattern is a bitmap that includes a plurality of bits, wherein each of the plurality of bits corresponds to a resource of the plurality of resources.

In a fifth aspect, alone or in combination with one or more of the first through fourth aspects, a first state of a bit, of the plurality of bits, indicates that the resource is an SBFD resource, and a second state of the bit, of the plurality of bits, indicates that the resource is not an SBFD resource.

In a sixth aspect, alone or in combination with one or more of the first through fifth aspects, the indication of the time domain pattern indicates a number of consecutive SBFD resources.

In a seventh aspect, alone or in combination with one or more of the first through sixth aspects, the indication of the time domain pattern further indicates a number of anchor resources and a number of transition resources, wherein the anchor resources are TDD resources and the transition resources include TDD resources and SBFD resources.

In an eighth aspect, alone or in combination with one or more of the first through seventh aspects, process 1200 includes transmitting an indication of a frequency resource allocation for the one or more SBFD resources, wherein the indication of the frequency resource allocation indicates a first set of sub-band frequencies for uplink communications and a second set of sub-band frequencies for downlink communications.

In a ninth aspect, alone or in combination with one or more of the first through eighth aspects, the indication of the frequency resource allocation indicates a plurality of frequency resource allocation configurations, and one of the frequency resource allocation configurations is a default frequency resource allocation configuration.

In a tenth aspect, alone or in combination with one or more of the first through ninth aspects, process 1200 includes transmitting an indication to update the time domain pattern, or an indication to switch between a first frequency resource allocation and a second frequency resource allocation, for the one or more SBFD resources.

In an eleventh aspect, alone or in combination with one or more of the first through tenth aspects, the indication to update the time domain pattern, or the indication to switch between the first frequency resource allocation and the second frequency resource allocation, is transmitted via DCI or a MAC message.

In a twelfth aspect, alone or in combination with one or more of the first through eleventh aspects, the base station is configured to perform SBFD communications and the UE is configured to perform half duplex communications.

In a thirteenth aspect, alone or in combination with one or more of the first through twelfth aspects, the indication of the time domain pattern is an indication of a time division duplexing pattern.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
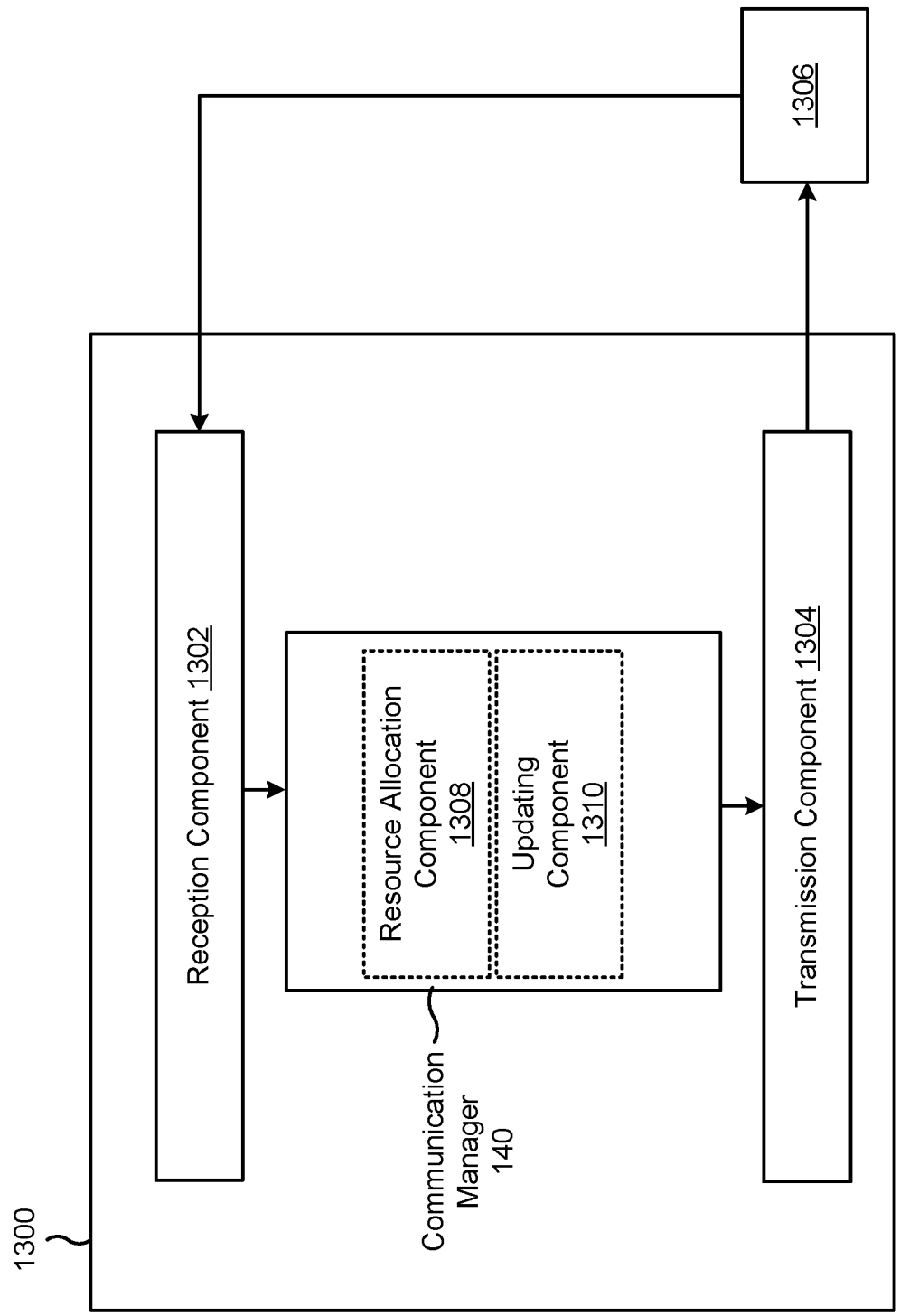
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a resource allocation component 1308, or an updating component 1310, among other examples.

In some aspects, the apparatus 1300 may be configured to perform one or more operations described herein in connection with FIGS. 5-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an indication of a time domain pattern for a plurality of resources that includes one or more FD resources. The reception component 1302 and/or the transmission component 1304 may communicate with a base station in accordance with the indication of the time domain pattern.

The resource allocation component 1308 may receive an indication of a frequency resource allocation for the one or more FD resources, wherein the indication of the frequency resource allocation indicates a first set of sub-band frequencies for uplink communications and a second set of sub-band frequencies for downlink communications.

The updating component 1310 may receive an indication to update the time domain pattern, or an indication to switch between a first frequency resource allocation and a second frequency resource allocation, for the one or more FD resources.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
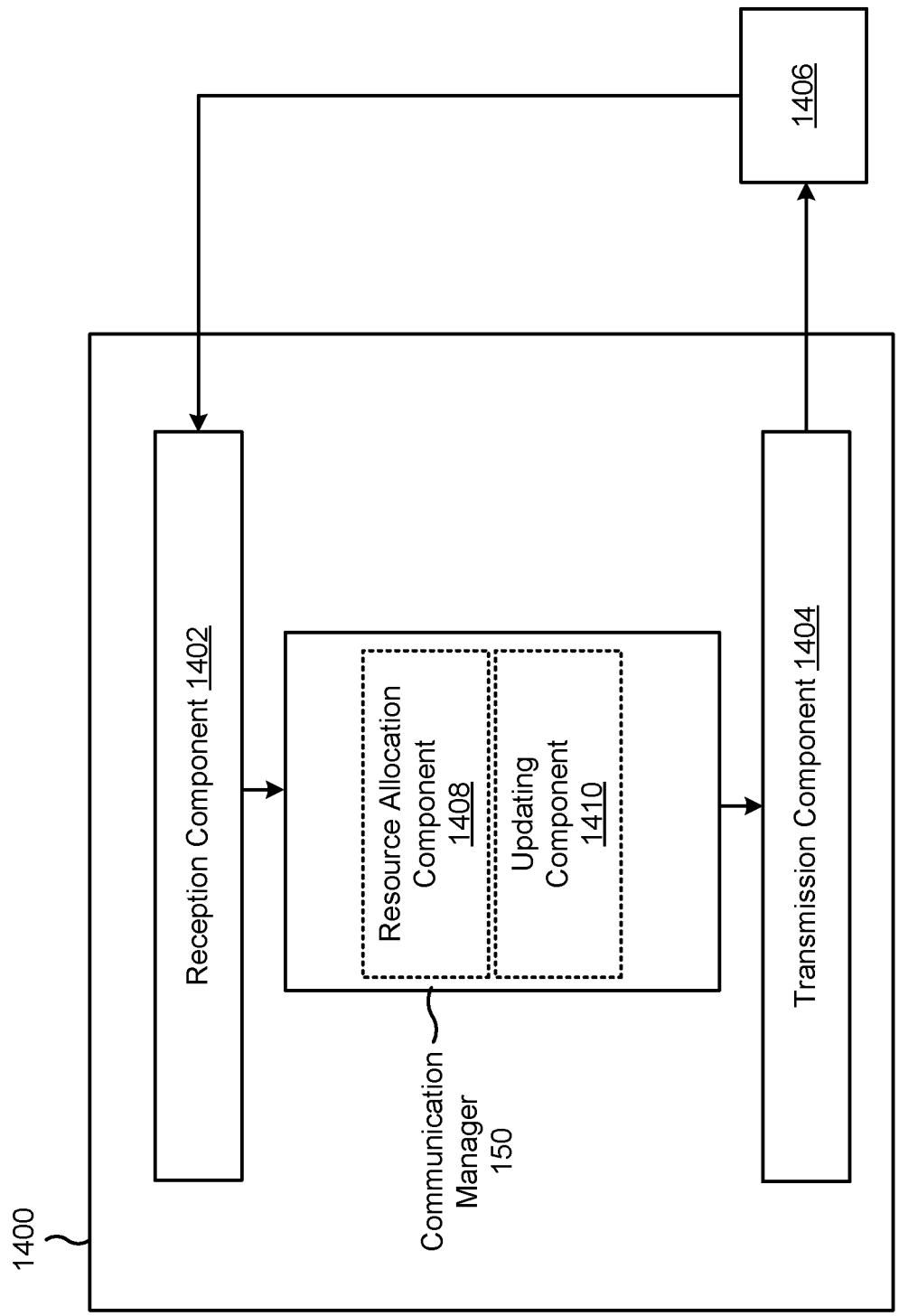
FIG. 14 is a diagram of an example apparatus for wireless communication, in accordance with the present disclosure.

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include one or more of a resource allocation component 1408, or an updating component 1410, among other examples.

In some aspects, the apparatus 1400 may be configured to perform one or more operations described herein in connection with FIGS. 5-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit an indication of a time domain pattern for a plurality of resources that includes one or more FD resources. The reception component 1402 and/or the transmission component 1404 may communicate with a UE in accordance with the indication of the time domain pattern.

The resource allocation component 1408 may transmit an indication of a frequency resource allocation for the one or more FD resources, wherein the indication of the frequency resource allocation indicates a first set of sub-band frequencies for uplink communications and a second set of sub-band frequencies for downlink communications.

The updating component 1410 may transmit an indication to update the time domain pattern, or an indication to switch between a first frequency resource allocation and a second frequency resource allocation, for the one or more FD resources.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
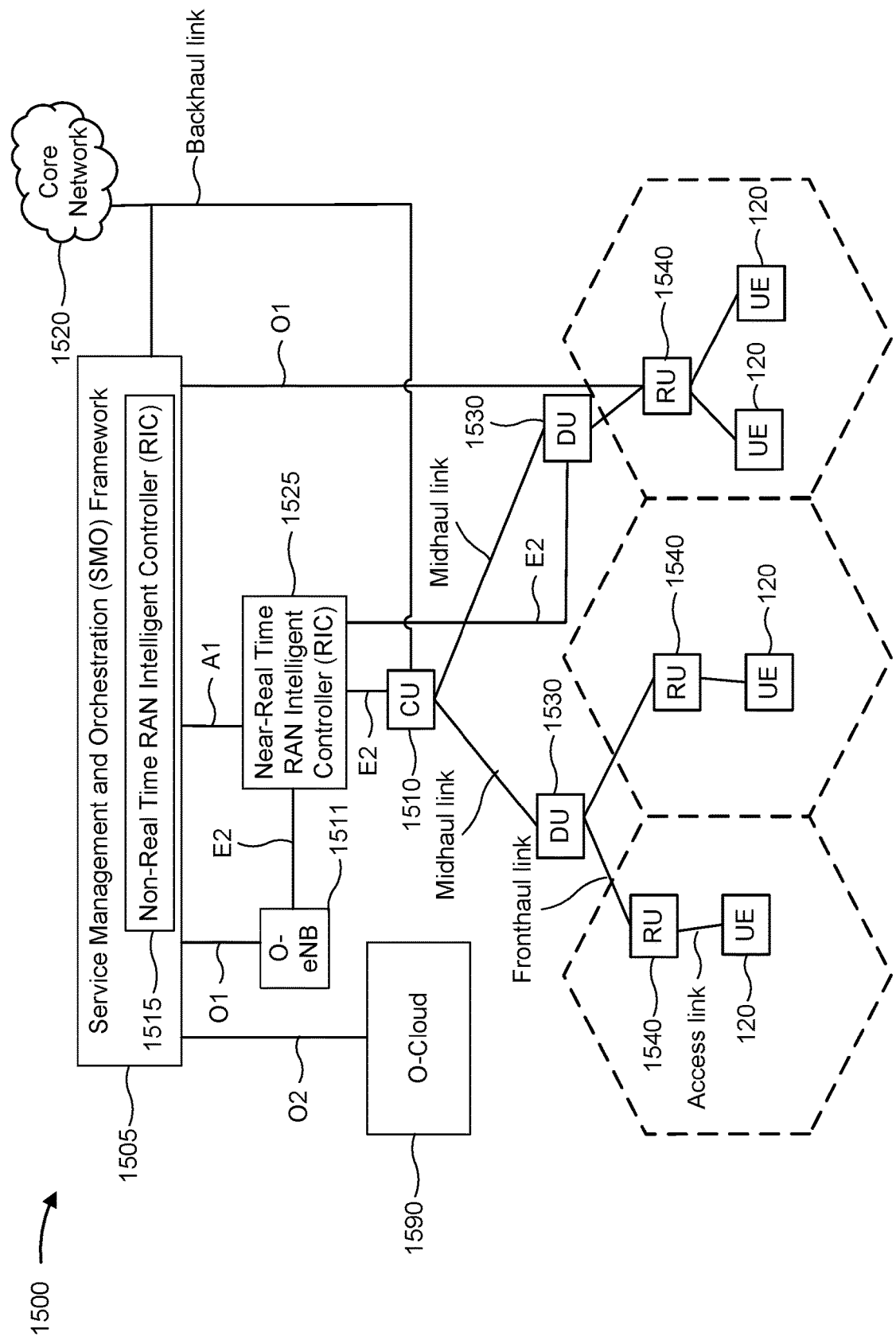
FIG. 15 is a diagram illustrating an example disaggregated base station architecture, in accordance with the present disclosure.

FIG. 15 is a diagram illustrating an example 1500 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 15 may include one or more CUs 1510 that can communicate directly with a core network 1520 via a backhaul link, or indirectly with the core network 1520 through one or more disaggregated base station units (such as a Near-Real Time (Near-RT) RAN Intelligent Controller (RIC) 1525 via an E2 link, or a Non-Real Time (Non-RT) RIC 1515 associated with a Service Management and Orchestration (SMO) Framework 1505, or both). A CU 1510 may communicate with one or more DUs 15150 via respective midhaul links, such as an F1 interface. The DUs 1530 may communicate with one or more RUs 1540 via respective fronthaul links. The RUs 1540 may communicate with respective UEs 120 via one or more radio frequency (RF) access links. In some implementations, the UE 120 may be simultaneously served by multiple RUs 1540.

Each of the units (e.g., the CUs 1510, the DUs 1530, the RUs 1540), as well as the Near-RT RICs 1525, the Non-RT RICs 1515, and the SMO Framework 1505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1510. The CU 1510 may be configured to handle user plane functionality (e.g., Central Unit-User Plane (CU-UP)), control plane functionality (e.g., Central Unit-Control Plane (CU-CP)), or a combination thereof. In some implementations, the CU 1510 can be logically split into one or more CU-UP units and one or more CU-CP units. The CU-UP unit can communicate bidirectionally with the CU-CP unit via an interface, such as the E1 interface when implemented in an O-RAN configuration. The CU 1510 can be implemented to communicate with the DU 1530, as necessary, for network control and signaling.

The DU 1530 may correspond to a logical unit that includes one or more base station functions to control the operation of one or more RUs 1540. In some aspects, the DU 1530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1530 may further host one or more low-PHY layers. Each layer (or module) can be implemented with an interface configured to communicate signals with other layers (and modules) hosted by the DU 1530, or with the control functions hosted by the CU 1510.

Lower-layer functionality can be implemented by one or more RUs 1540. In some deployments, an RU 1540, controlled by a DU 1530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1540 can be implemented to handle over the air (OTA) communication with one or more UEs 120. In some implementations, real-time and non-real-time aspects of control and user plane communication with the RU(s) 1540 can be controlled by the corresponding DU 1530. In some scenarios, this configuration can enable the DU(s) 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements which may be managed via an operations and maintenance interface (such as an O1 interface). For virtualized network elements, the SMO Framework 1505 may be configured to interact with a cloud computing platform (such as an open cloud (O-Cloud) 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540 and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with one or more RUs 1540 via an O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1525. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT RIC 1525.

In some implementations, to generate AI/ML models to be deployed in the Near-RT RIC 1525, the Non-RT RIC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT RIC 1525 may be configured to tune RAN behavior or performance. For example, the Non-RT RIC 1515 may monitor long-term trends and patterns for performance and employ AI/ML, models to perform corrective actions through the SMO Framework 1505 (such as reconfiguration via O1) or via creation of RAN management policies (such as A1 policies).

As indicated above, FIG. 15 is provided as an example. Other examples may differ from what is described with regard to FIG. 15.

The following provides an overview of some Aspects of the present disclosure:

Aspect 1: A method of wireless communication performed by a user equipment (UE), comprising: receiving an indication of a time domain pattern for a plurality of resources that includes one or more full duplex (FD) resources; and communicating with a base station in accordance with the indication of the time domain pattern.

Aspect 2: The method of Aspect 1, wherein the indication of the time domain pattern is received from the base station via a radio resource control message.

Aspect 3: The method of any of Aspects 1-2, wherein the indication of the time domain pattern indicates whether each resource, of the plurality of resources, is a first type of resource or a second type of resource, wherein the first type of resource is an FD resource and the second type of resource is an uplink resource, a downlink resource, or a flexible resource.

Aspect 4: The method of any of Aspects 1-3, wherein the plurality of resources is a plurality of slots for communicating with the base station, or a plurality of symbols for communicating with the base station.

Aspect 5: The method of any of Aspects 1-4, wherein the indication of the time domain pattern is a bitmap that includes a plurality of bits, wherein each bit of the plurality of bits corresponds to a resource of the plurality of resources.

Aspect 6: The method of Aspect 5, wherein a first state of a bit, of the plurality of bits, indicates that the resource is an FD resource, and a second state of the bit, of the plurality of bits, indicates that the resource is not an FD resource.

Aspect 7: The method of any of Aspects 1-6, wherein the indication of the time domain pattern indicates a number of consecutive FD resources.

Aspect 8: The method of Aspect 7, wherein the indication of the time domain pattern further indicates a number of anchor resources and a number of transition resources, wherein the anchor resources are time division duplex (TDD) resources and the transition resources include TDD resources and FD resources.

Aspect 9: The method of any of Aspects 1-8, further comprising receiving an indication of a frequency resource allocation for the one or more FD resources, wherein the indication of the frequency resource allocation indicates a first set of sub-band frequencies for uplink communications and a second set of sub-band frequencies for downlink communications.

Aspect 10: The method of Aspect 9, wherein the indication of the frequency resource allocation indicates a plurality of frequency resource allocation configurations, and wherein one of the frequency resource allocation configurations is a default frequency resource allocation configuration.

Aspect 11: The method of any of Aspects 1-10, further comprising receiving an indication to update the time domain pattern, or an indication to switch between a first frequency resource allocation and a second frequency resource allocation, for the one or more FD resources.

Aspect 12: The method of Aspect 11, wherein the indication to update the time domain pattern, or the indication to switch between the first frequency resource allocation and the second frequency resource allocation, is received via downlink control information (DCI) or a medium access control (MAC) message.

Aspect 13: The method of any of Aspects 1-12, wherein the base station is configured to perform FD communications and the UE is configured to perform half duplex communications.

Aspect 14: The method of any of Aspects 1-13, wherein the indication of the time domain pattern is an indication of a time division duplexing pattern.

Aspect 15: A method of wireless communication performed by a base station, comprising: transmitting an indication of a time domain pattern for a plurality of resources that includes one or more full duplex (FD) resources; and communicating with a user equipment (UE) in accordance with the indication of the time domain pattern.

Aspect 16: The method of Aspect 15, wherein transmitting the indication of the time domain pattern comprises transmitting a radio resource control message that includes the indication of the time domain pattern.

Aspect 17: The method of any of Aspects 15-16, wherein the indication of the time domain pattern indicates whether each resource, of the plurality of resources, is a first type of resource or a second type of resource, wherein the first type of resource is an FD resource and the second type of resource is an uplink resource, a downlink resource, or a flexible resource.

Aspect 18: The method of any of Aspects 15-17, wherein the plurality of resources is a plurality of slots for communicating with the UE, or a plurality of symbols for communicating with the UE.

Aspect 19: The method of any of Aspects 15-18, wherein the indication of the time domain pattern is a bitmap that includes a plurality of bits, wherein each of the plurality of bits corresponds to a resource of the plurality of resources.

Aspect 20: The method of Aspect 19, wherein a first state of a bit, of the plurality of bits, indicates that the resource is an FD resource, and a second state of the bit, of the plurality of bits, indicates that the resource is not an FD resource.

Aspect 21: The method of any of Aspects 15-20, wherein the indication of the time domain pattern indicates a number of consecutive FD resources.

Aspect 22: The method of Aspect 21, wherein the indication of the time domain pattern further indicates a number of anchor resources and a number of transition resources, wherein the anchor resources are time division duplex (TDD) resources and the transition resources include TDD resources and FD resources.

Aspect 23: The method of any of Aspects 15-22, further comprising transmitting an indication of a frequency resource allocation for the one or more FD resources, wherein the indication of the frequency resource allocation indicates a first set of sub-band frequencies for uplink communications and a second set of sub-band frequencies for downlink communications.

Aspect 24: The method of Aspect 23, wherein the indication of the frequency resource allocation indicates a plurality of frequency resource allocation configurations, and wherein one of the frequency resource allocation configurations is a default frequency resource allocation configuration.

Aspect 25: The method of any of Aspects 15-24, further comprising transmitting an indication to update the time domain pattern, or an indication to switch between a first frequency resource allocation and a second frequency resource allocation, for the one or more FD resources.

Aspect 26: The method of Aspect 25, wherein the indication to update the time domain pattern, or the indication to switch between the first frequency resource allocation and the second frequency resource allocation, is transmitted via downlink control information (DCI) or a medium access control (MAC) message.

Aspect 27: The method of any of Aspects 15-26, wherein the base station is configured to perform FD communications and the UE is configured to perform half duplex communications.

Aspect 28: The method of any of Aspects 15-27, wherein the indication of the time domain pattern is an indication of a time division duplexing pattern.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        receive an indication of a time domain pattern for a plurality of resources that includes one or more full duplex (FD) resources, wherein the indication of the time domain pattern indicates a number of anchor resources and a number of transition resources; and
        communicate with a network node in accordance with the indication of the time domain pattern;
        wherein the anchor resources are time division duplex (TDD) resources and the transition resources include TDD resources and FD resources.

2. The apparatus of claim 1, wherein the one or more FD resources are sub-band full duplex (SBFD) resources.

3. The apparatus of claim 1, wherein the indication of the time domain pattern further indicates whether each resource, of the plurality of resources, is a first type of resource or a second type of resource, wherein the first type of resource is an FD resource and the second type of resource is an uplink resource, a downlink resource, or a flexible resource.

4. The apparatus of claim 1, wherein the plurality of resources is a plurality of slots for communicating with the network node, or a plurality of symbols for communicating with the network node.

5. The apparatus of claim 1, wherein the indication of the time domain pattern is a bitmap that includes a plurality of bits, wherein each bit of the plurality of bits corresponds to a resource of the plurality of resources.

6. The apparatus of claim 5, wherein a first state of a bit, of the plurality of bits, indicates that the resource is an FD resource, and a second state of the bit, of the plurality of bits, indicates that the resource is not an FD resource.

7. The apparatus of claim 1, wherein the indication of the time domain pattern further indicates a number of consecutive FD resources.

8. The apparatus of claim 1, wherein the one or more processors are further configured to receive an indication of a frequency resource allocation for the one or more FD resources, wherein the indication of the frequency resource allocation indicates a first set of sub-band frequencies for uplink communications and a second set of sub-band frequencies for downlink communications.

9. The apparatus of claim 8, wherein the indication of the frequency resource allocation indicates a plurality of frequency resource allocation configurations, and wherein one of the frequency resource allocation configurations is a default frequency resource allocation configuration.

10. The apparatus of claim 1, wherein the one or more processors are further configured to receive an indication to update the time domain pattern, or an indication to switch between a first frequency resource allocation and a second frequency resource allocation, for the one or more FD resources.

11. The apparatus of claim 10, wherein the indication to update the time domain pattern, or the indication to switch between the first frequency resource allocation and the second frequency resource allocation, is received via downlink control information (DCI) or a medium access control (MAC) message.

12. An apparatus for wireless communication at a network node, comprising:
   a memory; and
   one or more processors, coupled to the memory, configured to:
      transmit an indication of a time domain pattern for a plurality of resources that includes one or more full duplex (FD) resources, wherein the indication of the time domain pattern indicates a number of anchor resources and a number of transition resources; and
      communicate with a user equipment (UE) in accordance with the indication of the time domain pattern;
      wherein the anchor resources are time division duplex (TDD) resources and the transition resources include TDD resources and FD resources.

13. The apparatus of claim 12, wherein the one or more processors, to transmit the indication of the time domain pattern, are configured to transmit a radio resource control message that includes the indication of the time domain pattern.

14. The apparatus of claim 12, wherein the indication of the time domain pattern further indicates whether each resource, of the plurality of resources, is a first type of resource or a second type of resource, wherein the first type of resource is an FD resource and the second type of resource is an uplink resource, a downlink resource, or a flexible resource.

15. The apparatus of claim 12, wherein the plurality of resources is a plurality of slots for communicating with the UE, or a plurality of symbols for communicating with the UE.

16. The apparatus of claim 12, wherein the indication of the time domain pattern is a bitmap that includes a plurality of bits, wherein each of the plurality of bits corresponds to a resource of the plurality of resources.

17. The apparatus of claim 16 wherein a first state of a bit, of the plurality of bits, indicates that the resource is an FD resource, and a second state of the bit, of the plurality of bits, indicates that the resource is not an FD resource.

18. The apparatus of claim 12, wherein the indication of the time domain pattern further indicates a number of consecutive FD resources.

19. The apparatus of claim 12, wherein the one or more processors are further configured to transmit an indication of a frequency resource allocation for the one or more FD resources, wherein the indication of the frequency resource allocation indicates a first set of sub-band frequencies for uplink communications and a second set of sub-band frequencies for downlink communications.

20. The apparatus of claim 19, wherein the indication of the frequency resource allocation indicates a plurality of frequency resource allocation configurations, and wherein one of the frequency resource allocation configurations is a default frequency resource allocation configuration.

21. The apparatus of claim 12, wherein the one or more processors are further configured to transmit an indication to update the time domain pattern, or an indication to switch between a first frequency resource allocation and a second frequency resource allocation, for the one or more FD resources.

22. The apparatus of claim 21, wherein the indication to update the time domain pattern, or the indication to switch between the first frequency resource allocation and the second frequency resource allocation, is transmitted via downlink control information (DCI) or a medium access control (MAC) message.

23. A method of wireless communication performed by a user equipment (UE), comprising:
   receiving an indication of a time domain pattern for a plurality of resources that includes one or more full duplex (FD) resources, wherein the indication of the time domain pattern indicates a number of anchor resources and a number of transition resources; and
   communicating with a network node in accordance with the indication of the time domain pattern;
   wherein the anchor resources are time division duplex (TDD) resources and the transition resources include TDD resources and FD resources.

24. The method of claim 23, wherein the indication of the time domain pattern further indicates whether each resource, of the plurality of resources, is a first type of resource or a second type of resource, wherein the first type of resource is an FD resource and the second type of resource is an uplink resource, a downlink resource, or a flexible resource.

25. The method of claim 23, wherein the indication of the time domain pattern is a bitmap that includes a plurality of bits, wherein each bit of the plurality of bits corresponds to a resource of the plurality of resources.

26. The method of claim 23, wherein the indication of the time domain pattern further indicates a number of consecutive FD resources.

27. A method of wireless communication performed by a network node, comprising:
   transmitting an indication of a time domain pattern for a plurality of resources that includes one or more full duplex (FD) resources, wherein the indication of the time domain pattern indicates a number of anchor resources and a number of transition resources; and
   communicating with a user equipment (UE) in accordance with the indication of the time domain pattern;
   wherein the anchor resources are time division duplex (TDD) resources and the transition resources include TDD resources and FD resources.

28. The method of claim 27, wherein the indication of the time domain pattern further indicates whether each resource, of the plurality of resources, is a first type of resource or a second type of resource, wherein the first type of resource is an FD resource and the second type of resource is an uplink resource, a downlink resource, or a flexible resource.

* * * * *